United States Patent
Zhu et al.

(10) Patent No.: US 12,042,450 B2
(45) Date of Patent: Jul. 23, 2024

(54) MULTIFUNCTIONAL BED, A MULTI-DRIVE SWITCH PROTECTION CIRCUIT AND ITS CONTROL DEVICE

(71) Applicant: Shanghai Winsunny Electronics Tech. Co. Ltd., Shanghai (CN)

(72) Inventors: Shuyi Zhu, Shanghai (CN); Zhenqiu Lu, Shanghai (CN); Chunlu Chen, Shanghai (CN)

(73) Assignee: Shanghai Winsunny Electronics Tech. Co. Ltd., Shanghai (CN)

( * ) Notice: Subject to any disclaimer, the term of this patent is extended or adjusted under 35 U.S.C. 154(b) by 387 days.

(21) Appl. No.: 17/522,940

(22) Filed: Nov. 10, 2021

(65) Prior Publication Data
US 2022/0347028 A1 Nov. 3, 2022

(30) Foreign Application Priority Data

Apr. 29, 2021 (CN) .......................... 202110476199.5
Apr. 29, 2021 (CN) .......................... 202110476220.1
(Continued)

(51) Int. Cl.
| | |
|---|---|
| A61G 7/018 | (2006.01) |
| A61G 7/015 | (2006.01) |
| G05B 19/042 | (2006.01) |

(52) U.S. Cl.
CPC .............. *A61G 7/018* (2013.01); *A61G 7/015* (2013.01); *G05B 19/042* (2013.01); *A61G 2203/10* (2013.01); *G05B 2219/2608* (2013.01)

(58) Field of Classification Search
None
See application file for complete search history.

(56) References Cited

U.S. PATENT DOCUMENTS 10,206,837 B2 2/2019 McNeely et al.
2021/0315755 A1* 10/2021 Matsubayashi ........ A61G 7/018
(Continued)

FOREIGN PATENT DOCUMENTS

| CN | 2899779 Y | 5/2007 |
|---|---|---|
| CN | 101710548 A | 5/2010 |

(Continued)

OTHER PUBLICATIONS

OA1, issued in CN202110558818.5 (priority application), by CNIPA, dated Oct. 19, 2021.
(Continued)

*Primary Examiner* — Adolf Dsouza
(74) *Attorney, Agent, or Firm* — Zhu Lehnhoff LLP

(57) ABSTRACT

A multifunctional bed, a multi-drive switch protection circuit and its control device, wherein in the multifunctional bed, when a switch group is not triggered to start by a user, all electric signal transmission paths are in a disconnected state, and after the switch group is operated to start by the user, an MOSFET unit is controlled to be conducted after delaying an arc extinguishing time period according to the arc extinguishing time preset by a micro control unit, so that the corresponding electric signal transmission paths are conducted, and a load driving device connected with the switch group runs after the switch group is triggered to start and the arc extinguishing time period is separated, so that a bed component of a bed main body is driven to adjust the corresponding posture.

20 Claims, 8 Drawing Sheets

(30) Foreign Application Priority Data

| Apr. 29, 2021 | (CN) | .......................... 202120913644.5 |
| Apr. 29, 2021 | (CN) | .......................... 202120916085.3 |
| May 21, 2021 | (CN) | .......................... 202110558818.5 |
| May 21, 2021 | (CN) | .......................... 202110558856.0 |

(56) References Cited

U.S. PATENT DOCUMENTS

2022/0108114 A1* 4/2022 Yoshida ............. G08B 21/0446
2022/0261020 A1* 8/2022 Garcia Molina ........ A61B 5/01

FOREIGN PATENT DOCUMENTS

| CN | 202236022 U | 5/2012 |
| CN | 102591233 A | 7/2012 |
| CN | 103035445 A | 4/2013 |
| CN | 203436505 U | 2/2014 |
| CN | 105515362 A | 4/2016 |
| CN | 206236467 U | 6/2017 |
| CN | 208738569 U | 4/2019 |
| CN | 209389965 U | 9/2019 |
| CN | 110739064 A | 1/2020 |
| CN | 211095438 U | 7/2020 |
| CN | 211610447 U | 10/2020 |
| CN | 211934611 U | 11/2020 |
| CN | 212016089 U | 11/2020 |
| CN | 112327696 A | 2/2021 |
| DE | 29701084 U1 | 5/1997 |

OTHER PUBLICATIONS

Applicant's response to OA, issued in CN202110558818.5 (priority application), by Shanghai Hansheng Intellectual Property Agency Co., Ltd., dated Dec. 8, 2021.
Applicant's supplemental Resonse to OA, issued in CN202110558818.5 (priority application), by Shanghai Hansheng Intellectual Property Agency Co., Ltd., dated Jan. 28, 2022.
Notice of Grant of Patent Rights, issued in CN202110558818.5 (priority application), by CNIPA, dated Feb. 16, 2022.

* cited by examiner

MULTIFUNCTIONAL BED, A MULTI-DRIVE SWITCH PROTECTION CIRCUIT AND ITS CONTROL DEVICE

CROSS-REFERENCE TO RELATED APPLICATIONS

The present application claims the priorities of these six Chinese applications: Chinese Patent Application No. 202110476220.1, filed Apr. 29, 2021; Chinese Patent Application No. 202110558818.5, filed May 21, 2021; Chinese Patent Application No. 202110558856.0, filed May 21, 2021; Chinese Patent Application No. 202110476199.5, filed Apr. 29, 2021; Chinese Patent Application No. 202120913644.5, filed Apr. 29, 2021; and Chinese Patent Application No. 202120916085.3, filed Apr. 29, 2021; the entire disclosures of which applications are incorporated herein by reference.

FIELD OF THE INVENTION

The invention relates to the technical field of switch circuit protection and multifunctional bed design, in particular, to a multifunctional bed, a multi-drive switch circuit protection device and a control device.

BACKGROUND OF THE INVENTION

The existing multifunctional bed can help patients and old people to adjust various postures such as lying and sitting, and is widely applied to hospitals, nursing homes and user families. The existing multifunctional bed is controlled intelligently, for example, equipment such as a visual operation screen and a microcomputer is adopted for control, but the higher the intellectualization is, the higher the corresponding equipment cost is, for some families, the intelligent equipment needs to consume excessive family cost, the multifunctional bed does not need to be too complicated, the cost is not too high, compared with a common bed, the purpose of adjusting the basic lying and sitting posture can be realized, and the inventor designs a multifunctional bed control device.

In the existing multifunctional bed control technology, the multifunctional bed generally comprises a trigger button, a controller, a plurality of load driving devices and a power supply device for supplying power to the load driving devices, wherein the output end of each load driving device is generally connected with each assembly unit of the multifunctional bed, and the assembly units of the multifunctional bed are controlled to carry out various postures (such as lifting or descending of units where lower limbs are located). The control technique generally includes two signal paths: a control signal path and an electrical signal path. The trigger button receives a trigger operation of a user to generate a trigger signal, then the trigger signal is sent to the controller, the controller sends a corresponding control signal to the corresponding load driving device to trigger the corresponding posture adjustment of the load driving device, and the path is called as a control signal path. The power supply additionally supplies power to the load driving device, which is referred to as an electrical signal path. Therefore, in the prior art, the control signal path and the electrical signal path are respectively arranged, the power supply device, the controller, the trigger button and various load driving devices are independent, and the controller and the load driving devices need to be respectively connected with the power supply device, so that the whole system has more parts and higher cost.

SUMMARY OF THE INVENTION

The embodiment of the application provides a multifunctional bed, a multi-drive switch protection circuit and a control device to solve the technical problem that the service life of the whole switch circuit is influenced because the switch is damaged due to overlarge instantaneous conduction current or electric arc generation in the posture control technology of the multifunctional bed, and achieve the beneficial effect that a time delay program is set before the conduction current to enable the switch to conduct the current after time delay to protect the service life of the switch.

In a first aspect, an embodiment of the present application provides a multifunctional bed, which comprises a bed body containing a plurality of bed components, and is characterized by further comprising: the bed comprises a switch control device used for receiving a user to control a plurality of bed components of the bed body to perform posture adjustment, a plurality of load driving devices arranged on the bed body and used for controlling the posture change of the bed assembly, a power supply control device used for controlling the transmission of electric signals and a power supply device used for supplying power;

the switch control device comprises at least one input end and a plurality of output ends, the input end is connected with the power supply control device, each output end of the switch control device is at least connected with one adaptive load driving device, and the switch control device is arranged with a switch group corresponding to the start operation of a user for receiving user-initiated operation in order to adapt to the load driving device, and the corresponding load driving device is controlled to move in a preset direction through the switch group; the number of the load driving devices is matched with that of the switch groups;

the power supply control device comprises a micro control unit, an MOSFET unit and a switch detection unit for detecting the switch group to be started by the operation of a user, the micro control unit is respectively connected with the MOSFET unit and the switch detection unit; wherein the micro control unit presets arc extinguishing time;

the power supply device is connected with the power supply control device, the power supply control device is connected with the input end of the switch control device, the output end of the switch control device is respectively connected with the adaptive load driving devices, the input end of the switch control device is connected with all the switch groups in parallel, and each switch group is connected with the adaptive load driving device;

when the switch group is not triggered to start by a user, all the electric signal transmission paths are in a disconnected state, and after the switch group is started by the user, the MOSFET unit is controlled to be switched on after delaying the arc extinguishing time period according to the arc extinguishing time preset by the micro control unit, so that the corresponding electric signal transmission paths are switched on, and the load driving device corresponding to the switch group operates after the switch group is triggered to start at the interval arc extinguishing time period, so as to drive the bed assembly of the bed main body to adjust the corresponding posture.

Further, the switch sets are pairs of switches, each of the pairs of switches comprising an uplink switch and a downlink switch, one of the uplink switch and the downlink switch being triggered to activate the electrical signal transmission path of the switch control device;

the switch detection unit is positioned on the electric signal transmission path where the power supply control device is positioned, and when the electric signal transmission path is conducted, the switch detection unit generates a corresponding electric signal; the micro control unit controls the MOSFET unit to be conducted in a delayed mode according to the electric signals generated by the switch detection unit, so that the electric signals generated by the switch detection unit pass through the MOSFET unit after the electric signals are subjected to arc extinguishing in a delayed mode, and then pass through the uplink switch/the downlink switch which is triggered to start, so that the output end of the connected load driving device is controlled to move, and the bed assembly is driven to move in an uplink mode or a downlink mode in a corresponding posture.

Further, the switch detection unit comprises a resistance RS1 adapted to the uplink switch and a resistance RS2 adapted to the downlink switch, the MOSFET unit comprises an MOSFET Q7 matched with the uplink switch and an MOSFET Q6 matched with the downlink switch; the micro control unit comprises a first input pin and a second input pin;

one end of the resistor RS1 is grounded, and the other end of the resistor RS1 is connected with a first input pin of the micro control unit and the source/drain electrode of the MOS transistor Q7 respectively; one end of the resistor RS2 is grounded, the other end of the resistor RS2 is connected with a second input pin of the micro control unit and a source/drain electrode of the MOSFET Q6 respectively, an electric signal generated by trigger operation is detected through the resistor RS1 or the resistor RS2, and a trigger signal is sent to the micro control unit.

Further, the micro control unit comprises an output pin, and the output pin of the micro control unit is connected to the gates of the MOS transistor Q7 and the MOS transistor Q6, respectively, for delaying a set arc extinguishing time and then sending a signal to the gate, so as to conduct the corresponding MOS transistor Q7 or the corresponding MOS transistor Q6.

Further, the arc extinguishing time is set to 150-300 ms.

Further, the micro control unit further comprises a false touch detection time, and the comparison of the false touch detection time is used for judging whether the duration time of the electric signal generated by the switch detection unit is longer than the false touch detection time, wherein if yes, the MOSFET unit is controlled to be conducted in a delayed manner according to the generated electric signal, and if not, the electric signal generated by the switch detection unit is continuously received.

Further, the micro control unit comprises a ROM program memory, a timer, by which arc extinguishing time and false touch detection time are preset, the ROM program memory is preset with a switch circuit protection program, the switch circuit protection program controls the conduction time-delay arc-extinguishing time period of the MOSFET unit, and the duration time of the electric signal generated by the switch detection unit is compared with the false touch detection time, so that the electric signal generated by the switch detection unit due to false triggering is prevented.

Further, the switch control device comprises a plurality of series and parallel connected light-emitting diodes, and the power control device is electrically connected to the power source, such that when the switch control device is electrically connected to the power control device, the power source continuously supplies power to the light emitting diodes.

Further, the load driving devices comprises a first driving device, a second driving device, and a third driving device, the switch group comprises a first switch pair, a second switch pair and a third switch pair; the bed assembly of the bed body comprises a leg unit, a head unit and a bed frame unit;

the first switch pair is connected with the first driving device and used for controlling the bed body to adjust the posture of the leg unit so as to enable the bed body to move upwards/downwards;

the second switch pair is connected with the second driving device and used for controlling the bed body to adjust the posture of the head unit so as to enable the bed body to move upwards/downwards;

the third switch pair is connected with the third driving device and used for controlling the bed body to adjust the posture of the bed frame unit so as to enable the bed body to move upwards/downwards.

Further, the multi-connector integrated cable comprises a trunk portion fixed to the bed body, a plurality of branch portions distributed on the trunk portion, each of the branch portions being connected to the input connector, the input output connector and the output connector.

Further, the multi-connector integrated cable comprises a trunk portion fixed to the bed body, a plurality of branch portions distributed on the trunk portion, each of the branch portions being connected to the input connector, the input output connector and the output connector.

Further, the trunk portion is provided with a plurality of retaining rings, the retaining rings being used to secure the trunk portion to one side of the bed body.

Further, the switch control device comprises a hand controller body and a circuit board fixed in the hand controller body; the surface of the hand controller main body is provided with a key panel, and the key panel is provided with a key part matched with the switch group;

the circuit board is provided with the uplink switch and the downlink switch, and the circuit board is abutted to the key part.

Further, the key portion is made of soft, elastic, light-transmitting silicone; a light-emitting circuit is arranged on the circuit board, and an LED light source is arranged on the light-emitting circuit; after the light-emitting circuit is electrically connected with the power supply control device, the LED light source continuously emits light and penetrates out along the key part to generate backlight so as to press the key in the dark and without illumination.

In a second aspect, an embodiment of the present application provides a multi-drive switch protection circuit, which comprises a power supply control circuit and a switch control circuit; the power supply control circuit is connected with a power supply device, and the switch control circuit is connected with various load driving devices; the switch control circuit, the power supply control device, the power supply device and the multiple load driving devices form an electric signal transmission path to supply power to the load driving devices and complete the adaptation of the load driving devices to trigger the load driving devices to drive corresponding load carriers to move;

the two ends of the switch control circuit are provided with an input end and a plurality of output ends, the input end is connected with the power supply control circuit, each output end of the switch control circuit is at least connected with one adaptive load driving device, and the switch control circuit is arranged with a switch group corresponding to the start operation of a user for receiving user-initiated operation in order to adapt to the load driving device, and the load driving device is controlled to move in a preset direction through the switch group; the number of the load driving devices is matched with that of the switch groups;

the power supply control circuit comprises a micro control circuit, an MOSFET circuit and a detection switch circuit for detecting the switch group to be started by the operation of a user, the micro control circuit is respectively connected with the MOSFET circuit and the detection switch circuit; wherein the micro control circuit presets arc extinguishing time;

the power supply control circuit is connected with the input end of the switch control circuit, the output end of the switch control circuit is respectively connected with the adaptive load driving devices, the input end of the switch control circuit is connected with all the switch groups in parallel, and each switch group is connected with the adaptive load driving device;

when the switch group is not triggered to start by a user, all the electric signal transmission paths are in a disconnected state, and after the switch group is started by the user, the MOSFET circuit is controlled to be switched on after delaying the arc extinguishing time period according to the arc extinguishing time preset by the micro control circuit, so that the corresponding electric signal transmission paths are switched on, and the load driving device corresponding to the switch group operates after the switch group is triggered to start at the interval arc extinguishing time period, so as to drive the corresponding load carrier to adjust the corresponding posture.

Further, the switch sets are pairs of switches, each of the pairs of switches comprising an uplink switch and a downlink switch, one of the uplink switch and the downlink switch being triggered to activate the electrical signal transmission path of the switch control circuit;

the switch detection circuit is positioned on the electric signal transmission path where the power supply control circuit is positioned, and when the electric signal transmission path is conducted, the switch detection circuit generates a corresponding electric signal; the micro control circuit controls the MOSFET circuit to be conducted in a delayed mode according to the electric signals generated by the switch detection circuit, so that the electric signals generated by the switch detection circuit pass through the MOSFET circuit after the electric signals are subjected to arc extinguishing in a delayed mode, and then pass through the uplink switch/the downlink switch which is triggered to start, so that the output end of the connected load driving device is controlled to move, thereby and the bed assembly is driven to move in an uplink mode or a downlink mode in a corresponding posture.

Further, the switch detection circuit comprises a resistance RS1 adapted to the uplink switch and a resistance RS2 adapted to the downlink switch, the MOSFET circuit comprises an MOSFET Q7 matched with the uplink switch and an MOSFET Q6 matched with the downlink switch; the micro control circuit comprises a first input pin and a second input pin;

one end of the resistor RS1 is grounded, and the other end of the resistor RS1 is connected with a first input pin of the micro control circuit and the source/drain electrode of the MOS transistor Q7 respectively; one end of the resistor RS2 is grounded, the other end of the resistor RS2 is connected with a second input pin of the micro control circuit and a source/drain electrode of the MOS transistor Q6 respectively, an electric signal generated by trigger operation is detected through the resistor RS1 or the resistor RS2, and a trigger signal is sent to the micro control circuit.

Further, the micro control circuit comprises an output pin, and the output pin of the micro control circuit is connected to the gates of the MOS transistor Q7 and the MOS transistor Q6 respectively, for delaying a set arc extinguishing time and then sending a signal to the gate, so as to conduct the corresponding MOS transistor Q7 or the corresponding MOS transistor Q6.

In a third aspect, an embodiment of the present application provides a control device, comprising a device body and a multi-drive switch protection circuit provided within the device body.

An embodiment of the present application provides a multifunctional bed, a multi-drive switch protection circuit and its control device that provide in the embodiment of this application has technical effects at least as follows:

1. because the switch control device is adopted to directly control each load driving device to work, and control programs of various work are not carried out on each load driving device, namely the switch control device is directly used as the current conduction function of the load driving device, the manufacturing process of the multifunctional bed control device is simplified, and the manufacturing cost and the equipment production cost are effectively reduced.

2. Because the switch control device is used as the middleware of the power supply control device and the load driving device in the multifunctional bed control device, the whole device has simple structure and is convenient for the maintenance of the multifunctional bed control device.

3. Due to the fact that the false touch detection time is preset in the adopted switch circuit protection strategy, the electric signal is changed into the switch closing signal, whether the reason for generating the switch closing signal is false triggering or not is judged, intermittent false opening caused by poor contact of the switch control device is avoided, and the service life of the switch control device is prolonged.

4. Due to the fact that the arc extinguishing time is preset in the adopted switch circuit protection strategy, when touching button switch in switch control device and triggering the closure, produce the closed signal of continuation switch, after lasting arc extinguishing time interval, switch on MOS pipe circuit, make the signal of telecommunication earlier through MOS pipe circuit, touch button switch again, just get into load drive arrangement, thereby make the switch on the on-off control device more stably, higher safely and higher reliably when the closure switches on.

Figure 1:
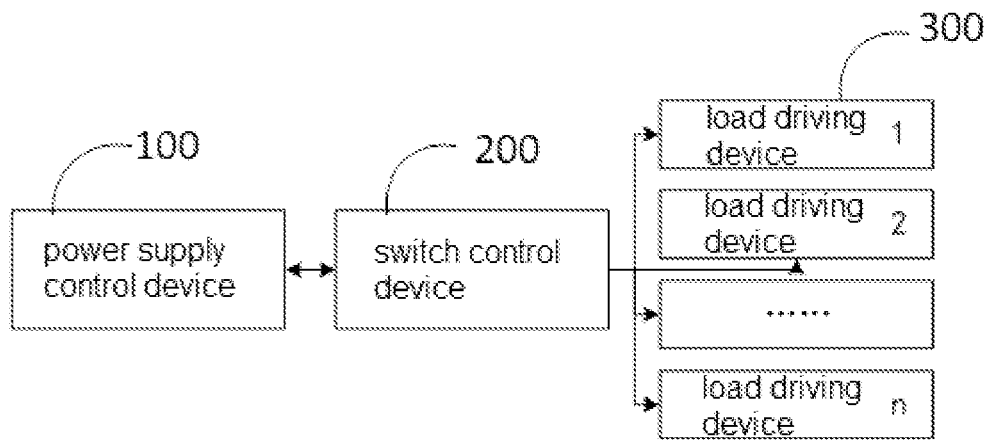
FIG. 1 is a block diagram of a driving structure of a multifunctional bed according to a first embodiment of the present application.
Figure 2:
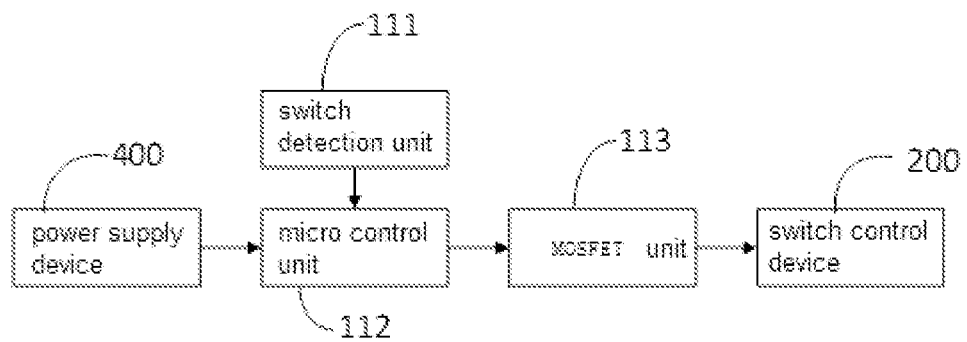
FIG. 2 is a block diagram of a driving control structure of a multifunctional bed according to a first embodiment of the present application.

REFERENCE NUMBERS power supply control device 100, switch control device 200, load driving device 300, power supply device 400, power supply control circuit 110, switch control circuit 230, switch detection unit 111, micro control unit 112, MOSFET unit 113, head unit A1, middle unit A2, leg unit A3, foot unit A4, multi-connector integrated cable 500, hand controller main body 210, key panel 211, key part 212, upper shell 213, bracket part 214, lower shell 215, circuit board 220, trunk part 510, branch part 520, input/output joint 530, output joint 540, input joint 550, reinforcement 560 and limit ring 511.

DETAILED DESCRIPTION

In order to better understand the technical scheme, the technical scheme is described in detail in the following with reference to the attached drawings of the specification and specific embodiments.

Example One

Referring to FIG. 1-12, the present application provides a multifunctional bed, which includes a bed body containing various bed components, and the bed body can assist the person in the bed to perform multi-posture adjustment, such as assisting the person in the bed to sit up or lie down, curling or straightening legs, and raising or lowering the bed as a whole. The bed body in this embodiment can be understood as a nursing bed having the above-described basic posture adjustment. In order to control the bed body to start, referring to FIG. 1-2, the present embodiment further includes: the bed comprises a switch control device 200 for receiving a user to control various bed components of a bed body to adjust the postures, various load driving devices 300 arranged on the bed body and used for controlling the posture change of the bed components, a power supply control device 100 used for controlling the transmission of electric signals and a power supply device used for supplying power. The power control device 100 is connected to a power supply device, which may be, but is not limited to, a 220V indoor storage battery power supply. When a battery is used, the battery may be built in the power supply control device 100. Further, the power control device 100 controls the voltage accessed by the power supply device to be converted into a safe direct current voltage, for example, the transmitted electrical signal adopts a safe direct current voltage smaller than 36Vdc, preferably 28v direct current, which can effectively reduce the safety problem caused by the wear of the equipment.

In the embodiment, an electric signal transmission path is formed among the switch control device 200, the power supply device 100 and the multiple load driving devices 300, so that power is supplied to the load driving devices, and the adaptive load driving devices are controlled to trigger the corresponding bed assembly posture adjustment. The power supply device is detachably connected with the power supply control device, and the switch control device is detachably connected with the power supply device and the load driving device. It can be seen that the switch control device 200 in this embodiment is a start control source and also has the function of an electrical signal transmission node, and provides a trigger signal for power supply start of the load driving device 300, and a flowing electrical signal.

The switch control device 200 in this embodiment includes at least one input end and a plurality of output ends, the input end is connected to the power control device 100, each output end is connected to at least one adaptive load driving device 300, and the switch control device 200 is configured for the adaptive load driving device 300 to receive a user to start and operate a corresponding switch group, and the switch group controls the corresponding load driving device 300 to perform a movement in a preset direction.

For further example, the switch control device 200 in this embodiment is a handheld device integrating a plurality of switches, the power control device 100 may be a simplified version of a power adapter, and the load driving device 300 may be a driving device. The switch control device 200 is electrically connected to the power control device 100 and the load driving device 300, respectively, and when a switch in the switch control device 200 is conducted, the power control device 100 supplies power to the load driving device.

And the number of the load driving devices in this embodiment is adapted to the number of the switch groups. For example, the number of the load driving devices is 3, the number of the corresponding switch groups is also 3, and each switch group in this embodiment corresponds to one load driving device. The design of switch block in this embodiment can adopt micro-gap switch, ship type switch, button switch, toggle switch, button switch, and the output end of the load driving device includes two direction motions, and allows speed to keep unchangeable, for the convenience of a user, the output end of the load driving device can be controlled according to the body comfort, when the multifunctional bed posture is driven to be adjusted to the optimal comfortable position, the control switch group is switched off, preferably to adopt micro-gap switch, so that the control is opened to closed by one step, and the switch with other structures needs at least two steps. In the embodiment, the switch control device is adopted to directly control each load driving device to work, and control programs on various work are not carried out on each load driving device, which is equivalent to the fact that the switch control device is directly used for the current conducting function of the load driving device, so that the manufacturing process of the multifunctional bed control device is simplified, the manufacturing cost and the equipment production cost is effectively reduced. In the multifunctional bed control device, the switch control device is used as a middleware of the power supply control device and the load driving device, so that the whole device has a simple structure and is convenient to maintain.

The starting operation for each switch group is matched with the output end of the load driving device, for example, the load driving device is a stepping motor, and the output shaft of the load driving device rotates in a forward direction or in a reverse direction, so that the switch group has two operations, one operation causes the output shaft of the stepping motor to rotate in the forward direction, and the other operation causes the output shaft of the stepping motor to rotate in the reverse direction.

The power supply control device in this embodiment includes a micro control unit, an MOS transistor unit, and a switch detection unit for detecting that the switch group is started by a user operation, where the micro control unit is connected to the MOS transistor unit and the switch detection unit, respectively. The micro control unit presets arc extinguishing time.

In this embodiment, the power supply device is connected to the power supply control device, the power supply control device is connected to the input end of the switch control device, the output end of the switch control device is respectively connected to the adaptive load driving device, the input end of the switch control device is connected to all the switch groups in parallel, and each switch group is connected to the adaptive load driving device, so as to form an electrical signal transmission channel. The electrical signal transmission channel in this embodiment includes two states, one is on state and the other is off state.

In this embodiment, when the switch group is not triggered to start by a user, all the electrical signal transmission paths are in a disconnected state, and after the switch group is started by the user, the MOSFET unit is controlled to be turned on after delaying the arc extinguishing time period according to the arc extinguishing time preset by the micro control unit, so that the corresponding electrical signal transmission paths are conducted, and thus the load driving device corresponding to the switch group operates after the switch group is triggered to start at the interval arc extinguishing time period, and the bed assembly of the bed main body is driven to perform adjustment of a corresponding posture.

Further, the main purpose of designing the arc extinguishing time is to avoid damage to the switch group caused by excessive instantaneous conduction current or electric arc generation when the switch group is started, which affects the service life of the whole switch control device, so the embodiment presets the arc extinguishing time; when any switch group triggers the start operation, when the switch detection unit produces the continuation electrical signal, control MOS pipe unit to switch on after the electrical signal lasts arc extinguishing time, and then utilize arc extinguishing time to make the electrical signal of switch group pass through the time delay, make the switch group trigger the start operation time to the electrical signal time-through with interval of arc extinguishing time, and realize that the closing time of the light touch button switch is always longer than the conduction time of the electrical signal. Furthermore, when the switch circuit is pressed to be closed through a delay program, the switch circuit is conducted after the arc extinguishing time is delayed, and the MOSFET unit is conducted, so that the electric signal enters the switch circuit after passing through the MOSFET unit. The arc extinguishing time in the embodiment is set to 150-300 milliseconds, and preferably, the arc extinguishing time is preset to 200 milliseconds. Further, when the trigger switch group is started, the micro control unit judges that the electric signal is generated due to the fact that the switch group is triggered according to the electric signal generated by the switch detection unit. And then according to arc extinguishing time and the continuous electrical signal, realize to control MOSFET unit to conduct after lasting arc extinguishing time, and then further realize the electrical signal of switch group goes through delay arc extinguishing time, and make the switch group trigger the start operation time to the electrical signal time through with interval of arc extinguishing time to avoid the light touch button switch lead to electric arc due to excessive electric current when pressing the closure.

Furthermore, the switch group is a switch pair, each switch pair comprises an uplink switch and a downlink switch, and one of the uplink switch and the downlink switch is triggered to start, so that the electric signal conducts on the transmission path where the switch control device is located. Further, the switch detection unit is located on the electrical signal transmission path where the power control device is located, and when the electrical signal transmission path where the switch control device is located is conducted, the switch detection unit generates a corresponding electrical signal. In this embodiment, as the switch detection unit and the switch group are located on one electrical signal transmission path loop, and when the switch block is triggered to start, the switch detection unit is triggered to start due to the fact that the switch group is connected to the power supply device in advance, so that the electrical signal transmission channel is conducted where the switch group is located, and the switch detection unit detects that the switch group is conducted to generate the corresponding electrical signal.

Further, the uplink switch in this embodiment is used to control the corresponding load driving device 300 to drive the bed assembly to perform the uplink motion of the corresponding posture, and the downlink switch is used to control the corresponding load driving device 300 to drive the bed body to perform the downlink motion of the corresponding posture. The uplink switch/the downlink switch in this embodiment may be a light touch button switch, that is, after the user continuously touches and presses the touch button switch, the electrical signal transmission path is conducted where the touch button switch is located, so that the switch detection unit generates an electrical signal and the electrical signal passes through the uplink switch/the downlink switch to supply power to the corresponding load driving device, and when the touch button switch is released, the power supply loop of the load driving device connected to the touch button switch is disconnected.

In this embodiment, the micro control unit controls the MOSFET unit to be conducted in a delayed manner according to the electrical signal generated by the switch detection unit, so that the electrical signal generated by the switch detection unit passes through the MOSFET unit after the arc extinguishing time period is delayed, and then passes through the uplink switch/the downlink switch which is triggered to be started, so as to control the output end of the connected load driving device to move, thereby driving the bed assembly to perform uplink motion or downlink motion in a corresponding posture. Therefore, when the switch group of the switch control device triggers the starting operation, the electric signal of the power supply device does not directly pass through the switch control device, but needs to be transmitted to the switch group of the switch control device after signal detection, transmission delay and channel conduction steps in the power supply control device, so that the triggering starting operation and the electric signal are staggered, the condition of generating electric arc is avoided, and the safety and the stability of the device are improved.

The switch detection unit in this embodiment includes a resistor RS1 adapted to the uplink switch and a resistor RS2 adapted to the downlink switch, and the MOSFET unit includes an MOSFET Q7 adapted to the uplink switch and an MOSFET Q6 adapted to the downlink switch; the micro control unit comprises a first input pin IS1 and a second input pin IS 2. One end of the resistor RS1 is grounded, and the other end of the resistor RS1 is connected with a first input pin of the micro control unit and the source/drain electrode of the MOSFET Q7 respectively; one end of the resistor RS2 is grounded, the other end of the resistor RS2 is connected with a second input pin of the micro control unit and a source/drain electrode of the MOSFET Q6, an electric signal generated by trigger operation is detected through the resistor RS1 or the resistor RS2, and a trigger signal is sent to the micro control unit.

The micro control unit in this embodiment includes an output pin Drv, and the output pin Dry of the micro control unit is respectively connected to the gates of the MOS transistor Q7 and the MOSFET Q6, and is configured to delay a set arc extinguishing time and then send a signal to the gate, so as to conduce the corresponding MOSFET Q7 or the corresponding MOSFET Q6.

Further, when the uplink switch is triggered to be started, the resistor RS1 generates a corresponding electrical signal according to a preset resistance value, the micro control unit receives the electrical signal generated by the resistor RS1 through the first input pin IS 1, and controls the delay conduction of the MOSFET Q7 according to the arc extinguishing time, so that the electrical signal generated by the resistor RS1 sequentially passes through the MOSFET Q7 and the uplink switch triggered to be started, and then supplies power to the connected load driving device, so that the load driving device performs a preset direction movement according to the corresponding electrical signal, and thus drives the corresponding bed assembly to perform an uplink movement in a corresponding posture.

When the downlink switch is triggered to be started, the resistor RS2 generates a corresponding electric signal according to a preset resistance value, the micro control unit receives the electric signal generated by the resistor RS2 through a second input pin IS2, and controls the delayed conduction of the MOSFET Q6 according to the arc extinguishing time, so that the electric signal generated by the resistor RS2 sequentially passes through the MOSFET Q6 and the downlink switch which is triggered to be started, and then power is supplied to the connected load driving device, and the load driving device can conveniently move in a preset direction according to the corresponding electric signal.

In one embodiment, the micro control unit further has a false touch detection time, and compares and judges whether the duration time of the electric signal generated by the switch detection unit is longer than the false touch detection time according to the false touch detection time, if so, the MOSFET unit is controlled to be switched on in a delayed manner according to the generated electric signal, and if not, the MOSFET unit continues to receive the electric signal generated by the switch detection unit. The false touch detection time preset by the switching circuit protection strategy judges the continuation that the signal of telecommunication produced to avoid false touch. The design of touching the button switch is adopted in this embodiment, just also need press and just can switch on, usually when pressed by mistake, can also switch on, this embodiment sets up first judgement basis based on this condition, for example when presetting the mistake touch check-out time be 30 ms, the fact that it does not take place the false touch for touching the button switch but normal use is judged, after giving the correct judgement result, then get into next link, and receive the electrical signal again and test the electrical signal, perhaps signal delay transmission control makes the preparation MOSFET unit switch on. The false touch detection time is preset in the switch circuit protection strategy adopted in the embodiment, so that the electric signal is changed into the switch closing signal, whether the reason for generating the switch closing signal is false triggering or not is judged, intermittent false opening caused by poor contact generated by the switch control device is avoided, and the service life of the switch control device is prolonged.

Further, the micro control unit in this embodiment includes a ROM program memory and a timer, the arc extinguishing time and the false touch detection time are preset by the timer, a switch circuit protection program is preset in the ROM program memory, the MOSFET circuit is controlled by the switch circuit protection program to be conducted for a delayed arc extinguishing time period, and the duration time of the electrical signal generated by the switch detection unit is compared with the false touch detection time, so as to prevent the electrical signal generated by the switch detection unit due to false triggering.

Therefore, it can be known that the micro control unit 112 of this embodiment presets the false touch detection time and the arc extinguishing time. Firstly, receive an electric signal generated by a switch detection unit, and the generation of the electric signal means that a switch group is operated and started by a user; secondly, according to a switch circuit protection program and the false touch detection time, judge whether a false triggering event occurs or not, and through comparison judge whether the duration time of the generated electric signal is longer than the false touch detection time or not, if so, control the MOSFET unit 113 to perform signal transmission after delay conduction according to the generated electric signal, and if not, continuously receive the electric signal generated by the switch detection unit 111; thirdly, according to the arc extinguishing time, the MOSFET unit is controlled to be conducted after the electric signal is generated and the arc extinguishing time period is continued, further leading the signal conduction of the switch group to delay the arc extinguishing time period, leading the time from the trigger time of the starting operation of the switch group to the signal passing time to be staggered, arc extinguishing time periods are arranged at intervals, the duration time of the starting operation of the switch group is always longer than the signal conducting time of the switch group, the electric signals sequentially pass through the micro control unit 112, the MOSFET unit 113 and the uplink switch/downlink switch in the switch group, and transmitted to the load driving device 300 electrically connected with the switch group to realize that the load driving device 300 connected with the switch group operates after the switch group triggers the start interval arc extinguishing time period to drive the bed assembly to adjust the corresponding posture, therefore, when the posture of the bed body of the multifunctional bed is adjusted, the driving control can be performed safely, effectively and inexpensively, through the switch control device 200

In one embodiment, the multifunctional bed has a posture adjusting function for the person in the bed including sitting up, leg bending and stretching and integral lifting, and further, the load driving device comprises a first driving device, a second driving device and a third driving device. The switch group comprises a first switch pair, a second switch pair and a third switch pair; the bed assembly of the bed body includes a leg unit, a head unit, and a bed frame unit. The first switch pair is connected with the first driving device and used for controlling the bed body to adjust the posture of the leg unit so as to enable the bed body to move upwards/downwards; the second switch pair is connected with the second driving device and used for controlling the bed body to adjust the posture of the head unit so as to enable the bed body to move upwards/downwards; the third switch pair is connected with the third driving device and used for controlling the bed body to adjust the posture of the bed frame unit so as to enable the bed body to move upwards/downwards.

Figure 3:
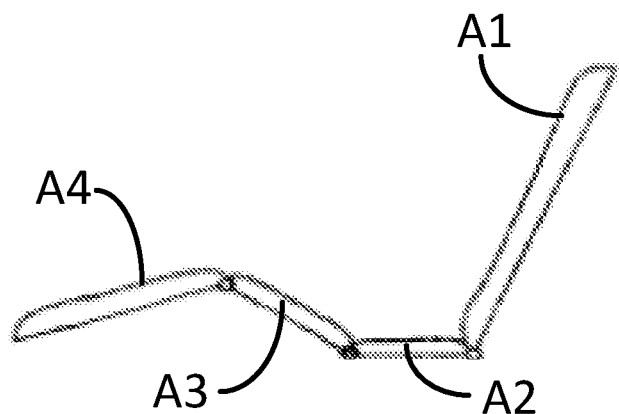
FIG. 3 is a partial structural view of a multifunctional bed body according to a first embodiment of the present application.
Figure 4:
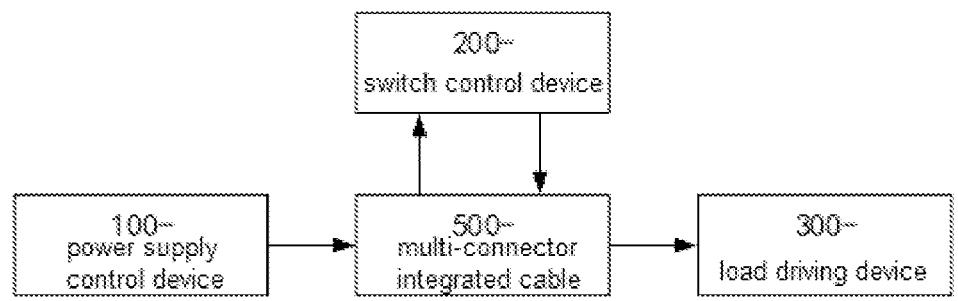
FIG. 4 is a block diagram of a multifunctional bed control device according to an embodiment of the present application.
Figure 5:
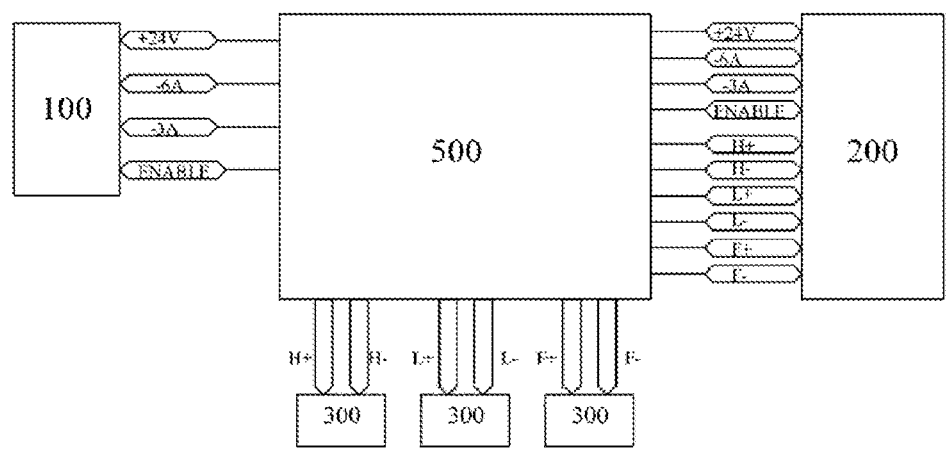
FIG. 5 is a block diagram of a pin connection of a multifunctional bed control device according to an embodiment of the present application.
Figure 6:
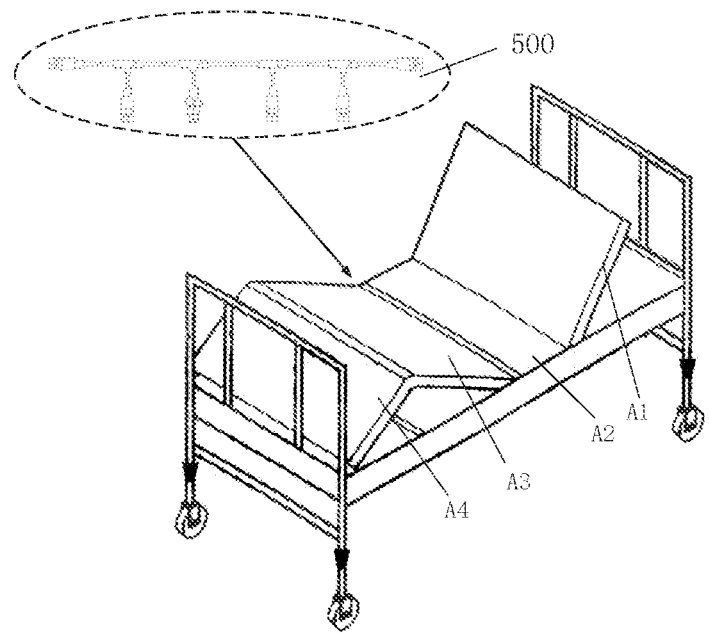
FIG. 6 is a schematic view of an embodiment of a multifunctional bed connected to a multi-connector integrated cable.

Further described, the structure of the multifunctional bed comprises a bed frame, support legs and a bed board, wherein the support legs are arranged below the bed frame unit, the bed board is arranged in the bed frame, referring to FIG. 3, the bed board comprises a head unit A1, a middle unit A2, a leg unit A3 and a foot unit A4, the head unit A1 is hinged to the middle unit, the middle unit A2 is hinged to the leg unit, the leg unit A3 is hinged to the foot unit A4, and the middle unit is fastened to the bed frame. Further, the first driving device is used for controlling the movement of the leg unit A3 to drive the legs of the person in the bed to bend or straighten, the second driving device is used for controlling the movement of the head unit A1 to drive the person in the bed to sit up or lie down, and the third driving device is used for controlling the movement of the bed frame unit to drive the person in the bed to ascend or descend.

Furthermore, the first switch pair comprises an uplink switch S-1 and a downlink switch S-2, wherein the uplink switch S-1 is connected with the first driving device and controls the uplink motion H+ thereof, and the downlink switch S-2 is connected with the first driving device and controls the downlink motion H− thereof; the second switch pair comprises an uplink switch S-3 and a downlink switch S-4, wherein the uplink switch S-3 is connected with the second driving device and controls the uplink movement L+ thereof, and the downlink switch S-4 is connected with the second driving device and controls the downlink movement L−; the third switch pair comprises an ascending switch S-5 and an ascending switch S-6, wherein the ascending switch S-5 is connected with a third driving device to control the ascending movement F+, and the descending switch S-6 is connected with the third driving device to control the descending movement F−.

In addition, in one embodiment, a plurality of light-emitting diodes connected in series and in parallel are disposed in the switch control device 200, and are electrically connected to the power supply through the power supply control device, so that when the switch control device is electrically connected to the power supply control device, the power supply continuously supplies power to the light-emitting diodes. Furthermore, the surface of the switch control device is made of a soft elastic light-transmitting silica gel material. Further, the light-emitting diode continuously emits light and penetrates out along the surface of the switch control device to generate backlight, so that the operation starting is facilitated in the dark and without light.

The embodiment further includes a multi-connector integrated cable 500, the multi-connector integrated cable 500 includes at least one input terminal 550, at least one input/output terminal 530, and a plurality of output terminals 540, the input terminal 550 is connected to the power control apparatus 100, the input/output terminal 530 is connected to the switch control apparatus 200, and each output terminal 540 is connected to an adapted load driving apparatus 500; the electrical signal transmission path formed among the switch control device 200, the power control device 100 and the multiple load driving devices 300 supplies power to the load driving devices 300 through the multi-connector integrated cable 500 and controls the adaptive load driving devices 300 to trigger the corresponding bed assembly posture adjustment.

Further, the multi-connector integrated cable 500 is fixedly connected along one side of the bed body, so as to install and bind the multi-tap integrated cable 500 on the bed body and facilitate a person in the bed or out of the bed to touch the switch control device 200 to control the adjustment. The multi-connector integrated cable 500 in this embodiment is detachably and electrically connected to the load driving device 300, the power control device 100, and the switch control device 200, and after the switch control device 200 is triggered to start, the electrical signal output by the power control device 100 is transmitted to the load driving device 300 electrically connected thereto from the switch set in a pressed state, so as to control the movement of the corresponding bed component. Further, the electrical signal transmitted based on the power control device 100 in this embodiment is controlled to be a safe dc voltage, so that when the electrical signal passes through the multi-connector integrated cable 500, the safety problem caused by the breakage of the multi-connector integrated cable 500 can be effectively reduced.

In one embodiment, the multi-connector integrated cable 500 includes a trunk portion 510 fixed to the bed body, and a plurality of branch portions 520 distributed on the trunk portion 510, wherein each of the branch portions 520 is correspondingly connected to the input connector 550, the input connector 530 and the output connector 540. Further, the input connector 550, the input-output connector 530, and the output connector 540 may be considered as a switch connector, a power connector, and a driving connector respectively. The switch control device 200 is connected through an input/output connector 530, the power supply control device 100 is connected through an input connector 550, and the load driving device 300 is connected through an output connector 540. When the input/output connector 530, the input connector 550, and the output connector 540 in this embodiment are connected to peripheral devices, such as the switch control device 200, the power control device 100, and the load driving device 300, the connection is made by a plug-in connection, and the connection is reinforced by the reinforcing member 560. In one embodiment, the input/ output connector 530 is an AISG connector of an M13 core and the input connector 550 is an AISG connector of an M4 core.

In one embodiment, the input/output connector 530, the input connector 550 and the output connector 540 are symmetrically provided with mounting bosses, and the reinforcing member 560 is symmetrically provided with mounting holes, and the mounting holes are sleeved on the mounting bosses, so that the reinforcing member 560 is movably mounted on the input/output connector 530, the input connector 550 and the output connector 540. Furthermore, the reinforcing member 560 is symmetrically provided with a limiting groove, the plugging object is symmetrically provided with a limiting protrusion, and the limiting groove is clamped on the limiting protrusion, so that the plugged input/output connector 530, the plugged input connector 550 and the plugged output connector 540 are fixedly mounted on the plugging object. Through the technical scheme of reinforcement 560 in this application embodiment, at least with the technical effect such as anti-drop, waterproof.

In one embodiment, the multi-connector integrated cable 500 includes a first core, a second core; the first core is used to electrically connect the input/output connector 530 and the input connector 550, and the second core is used to electrically connect the input/output connector 530 and each output connector 540. Further, the multi-connector integrated cable 500 includes an isolation layer, respectively wrap up the first core and the second core through the isolation layer. The isolation layer can adopt the PBT hard rubber material, consequently can know, between the first core and the second core, between the first core, and between the second core, do not interfere with each other, thus ensuring the steady operation of the multi-connector integrated cable in this embodiment. In another embodiment, the cable main part is whole to be wrapped up in a waterproof insulating layer, and the waterproof insulating layer adopts waterproof insulating material, for example, the insulating TPE waterproof material of plastic.

In order to facilitate the fixing and assembling of the multi-connector integrated cable 500 to the bed body of the multifunctional bed, the trunk line portion 510 in this embodiment is provided with a plurality of limiting rings 511, and the trunk line portion 510 is fixed to one side of the bed body by using the limiting rings 511. Each spacing ring and branch line portion 520 are adjacently arranged, further connect a plurality of ribbons on the trunk line portion 510, make the cable main part install on multi-functional bed through the ribbon, and further the multi-connector integrated cable is spacing on the spacing ring through the ribbon, which avoids the multi-connector integrated cable to slide and move in the multi-functional bed.

The switch control device 200 in this embodiment includes a hand controller main body 210 and a circuit board 220 fixed in the hand controller main body 210; the surface of the hand controller main body 210 is provided with a key panel 211, and the key panel 211 is provided with a key part matched with the switch group. The circuit board is provided with the uplink switch and the downlink switch, and the circuit board is abutted to the key part. Further, the key section is adapted to the uplink switch/downlink switch. For further example, the uplink switch/downlink switch is a micro switch, a touch button switch, and is described by touching the button switch. A switch circuit is arranged on the circuit board 220, and a touch button switch is welded on the switch circuit and abuts against the key part 212; the input terminal of the switch circuit is used for connecting the power control device 300, and the output terminal of the switch circuit is used for connecting the load driving device 300. Further, the key portion 212 in this embodiment is continuously pressed to drive the tact button switch to be continuously closed, so that the current output by the power control device 100 is transmitted to the load driving device 300, so as to supply power to move the output end of the load driving device 300. The hand controller body 210 is a controller held by a hand, and considering that a holding person may be a person in bed or a person outside the bed, the switch control device 200 in this embodiment may also be referred to as a simplified version of the integrated switch for a multifunctional bed, in this embodiment, any connected load driving device 300 needs to be continuously turned on and off in response to a connected switch to present a power-on state, and then the switch is started all the time, and a person in the bed can press the switch all the time according to a posture comfort level until the pressing is stopped at a most comfortable angle.

Further, the hand controller main body 210 in this embodiment includes an upper casing 213, a lower casing 215, and a bracket portion 214, the bracket portion 214 is fixed to the upper casing 213, and the bracket portion 214 is provided with a positioning hole; the circuit board 220 is fixed to the lower housing 215, and the tact button switch thereon passes through the positioning hole and abuts against the upper housing 213. It can be known that the main body of the handset is a shell design of the hand-holding part, the shell design meets the ergonomic and beautiful design from the size and the shape, and the operation is convenient and the safety is more guaranteed. The concave parts are symmetrically arranged on the outer surface of the lower shell 215, so that the hand controller main body 210 can be conveniently held by the concave parts, and the hand controller main body is prevented from slipping off when being held.

Further, the key panel 211 in this embodiment is concave, each key portion 212 is convex along the bottom of the concave, and the key portions 212 and the concave are integrally formed. The concave key panel 211 and the convex key part 212 in the embodiment of the present application, and the integrated processing design, at least have the advantages of preventing false touch, being waterproof, and being attractive in design. Compared with the design of traditional key panel 111, for example key panel 211 directly is the straight board surface of casing, and the button which is at the bellied design in surface, the key panel 211 of concave surface design is safer in this embodiment, even key panel 211 is pushed down by the article, which can also avoid the risk that key portion 212 is pressed to a certain extent, thus it is safer to use. Because the integrated structure is adopted, the waterproof and dustproof performances are guaranteed.

Further, each group of key parts 212 is provided with wear-resistant function marks, and each key part 212 is provided with wear-resistant indication marks. For example, the wear-resistant properties of the marking are achieved by using laser labeling techniques. Further, on the multifunctional bed, the load driving device 300 includes a sitting-up mechanism, a leg bending and stretching mechanism and a bed frame lifting mechanism, each group of the key parts 212 respectively controls the sitting-up mechanism, the leg bending and stretching mechanism and the bed frame lifting mechanism to work correspondingly, each group of the key parts 212 adopts a wear-resistant laser technology to perform function marking, for example, the sitting-up mechanism is provided with a "head" mark to control the head and upper body movements of the people on the bed, the leg bending and stretching mechanism is provided with a "foot" mark to control the foot and lower body movements of the people on the bed, the bed frame lifting mechanism is provided with a "bed body" mark to control the integral ascending or descending movements of the people on the bed, and the graphic marks for the users are more convenient. Further, the identification of the movement of the load driving apparatus 300 is facilitated by an indication mark such as an "arrow" or a "triangle". In the embodiment, the wear-resistant technology is adopted for marking, so that long-time wear in use is avoided.

In one embodiment, the key portion 212 is made of a soft, elastic and light-transmitting silicone material. The circuit board 220 is provided with a light emitting circuit, the light emitting circuit is provided with an LED light source, and after the light emitting circuit is electrically connected with the power control device 100, the LED light source continuously emits light and penetrates out along the key part 212 to generate backlight so as to press the key in the dark and without light. Furthermore, a plurality of light-emitting diodes connected in series and in parallel are arranged on the light emitting circuit in the embodiment, and the power supply control device is electrically connected with the power supply, so that when the switch control device is electrically connected with the power supply control device, the power supply continuously supplies power to the light-emitting diodes.

The method for applying the multifunctional bed control device comprises the following steps: s110: the switch control device 100, the multi-connector integrated cable 500, the power control device 100, and the plurality of load driving devices 300 are installed on the multifunctional bed.

S120: the switch control device 200, the power supply control device 100, and the load driving device 300 are plugged into the multi-connector integrated cable 500 to be electrically connected.

S130: a button part 212 on the switch control device 200 is pressed according to the requirement to control the corresponding output end of the load driving device 300 to move, so as to realize the adjustment of the posture of the multifunctional bed.

Example Two

Referring to FIGS. 13 to 17, the embodiment of the present application provides a multi-driving switch protection circuit, which is adapted to a multifunctional bed according to any one of the embodiments, although the function object of the present application is not limited to the multifunctional bed, such as a massage chair, a sofa.

The multi-driving switch protection circuit in this embodiment includes a power control circuit 110 and a switch control circuit 230. The power control circuit 110 is connected with a power supply device, and the switch control circuit 230 is connected with various load driving devices 300; the switch control circuit 230, the power control circuit 110, the power supply device and the plurality of load driving devices 300 form an electrical signal transmission path to supply power to the load driving devices 300 and complete adapting of the load driving devices 300 to trigger the load driving devices to drive corresponding load carriers to move. Wherein, the loading carrier can be, but is not limited to, the multifunctional bed in the first embodiment.

Further, two ends of the switch control circuit 230 are provided with an input end and a plurality of output ends, the input end is connected to the power control circuit 110, each output end is connected to at least one adaptive load driving device 300, and the switch control circuit 230 is configured to adapt to the load driving device 300 and configured to receive a switch group corresponding to a user start operation, and control the load driving device 300 to perform a motion in a preset direction through the switch group; and the number of the load driving devices 300 is adapted to the number of the switch sets.

The power control circuit 110 includes a micro control circuit, an MOSFET circuit and a detection switch circuit for detecting that the switch group is started by a user operation, the micro control circuit is connected to the MOSFET circuit and the detection switch circuit respectively; the micro-control circuit presets arc extinguishing time.

The power control circuit 110 is connected to the input end of the switch control circuit 230, the output ends of the switch control circuit 230 are respectively connected to the adaptive load driving devices 300, the input end of the switch control circuit 230 is connected to all the switch sets in parallel, and each switch set is connected to the adaptive load driving device 300.

When the switch group is not triggered to start by a user, all the electric signal transmission paths are in a disconnected state, and after the switch group is started by the user, the MOSFET circuit is controlled to be switched on after delaying the arc extinguishing time period according to the arc extinguishing time preset by the micro control circuit, so that the corresponding electric signal transmission paths are switched on, and the load driving device corresponding to the switch group operates after the switch group is triggered to start at the interval arc extinguishing time period, so as to drive the corresponding load carrier to perform corresponding posture adjustment. The arc extinguishing time has been preset among the switching circuit protection strategy adopted in this embodiment, when touching button switch in on-off control device and triggering the closure, produce the closed signal of continuation switch, after lasting arc extinguishing time interval, switch on MOSFET circuit, make the electrical signal earlier through MOSFET circuit, touch button switch again, just get into load drive arrangement, thereby make the switch on the on-off control device more stable, higher security, higher reliability when the closure switches on.

The switch group in this embodiment is a switch pair, each switch pair includes an uplink switch and a downlink switch, and one of the uplink switch and the downlink switch is triggered and started to conduct the electrical signal transmission path where the switch control circuit is located; the switch detection circuit is positioned on the electric signal transmission path where the power supply control circuit is positioned, and when the electric signal transmission path is conducted, the switch detection circuit generates a corresponding electric signal; the micro control circuit controls the time delay conduction of the MOSFET circuit according to the electric signal generated by the switch detection circuit, so that the electric signal generated by the switch detection circuit passes through the MOSFET circuit after the arc extinguishing time period is delayed, and then passes through the uplink switch/the downlink switch which is triggered and started to control the output end of the connected load driving device to move, thereby driving the load carrier to carry out uplink motion or downlink motion with corresponding postures.

Further, the switch detection circuit comprises a resistor RS1 matched with the uplink switch and a resistor RS2 matched with the downlink switch, and the MOSFET circuit comprises a MOS transistor Q7 matched with the uplink switch and a MOS transistor Q6 matched with the downlink switch; the micro control circuit comprises a first input pin and a second input pin; one end of the resistor RS1 is grounded, and the other end of the resistor RS1 is connected with a first input pin of the micro control circuit and the source/drain electrode of the MOS transistor Q7 respectively; one end of the resistor RS2 is grounded, the other end of the resistor RS2 is connected with a second input pin of the micro control circuit and a source/drain electrode of the MOS transistor Q6, an electric signal generated by trigger operation is detected through the resistor RS1 or the resistor RS2, and a trigger signal is sent to the micro control circuit.

Further, the micro control circuit includes an output pin, and the output pin of the micro control circuit is connected to the gates of the MOS transistor Q7 and the MOS transistor Q6, respectively, and is configured to delay the set arc extinguishing time and then send a signal to the gate, so as to turn on the corresponding MOS transistor Q7 or the corresponding MOS transistor Q6.

Figure 7:
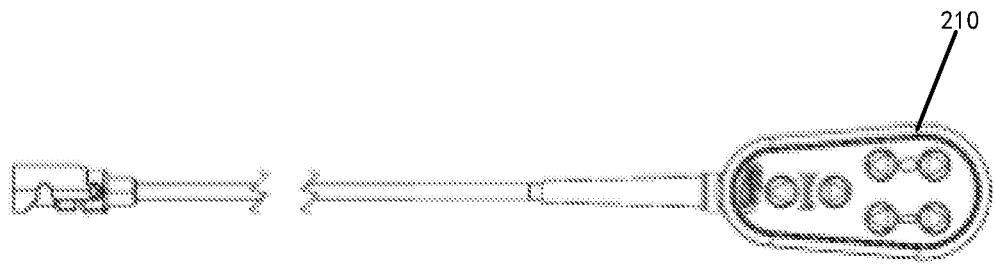
FIG. 7 is a schematic structural diagram of a switch control device according to an embodiment of the present application.
Figure 8:
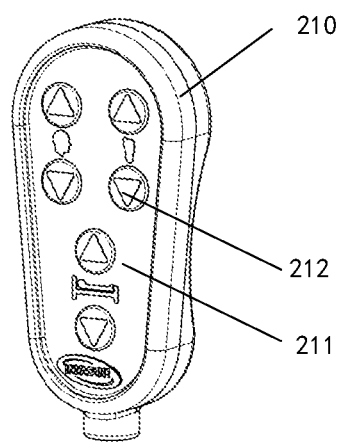
FIG. 8 is a schematic structural diagram of a main body of a manual controller according to an embodiment of the present application.
Figure 9:
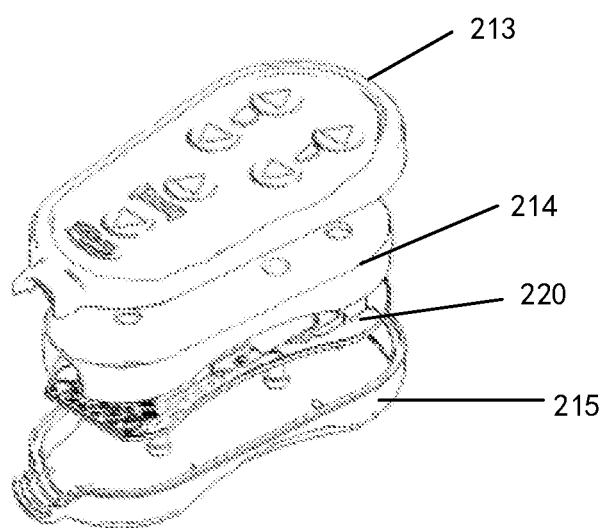
FIG. 9 is an exploded view of a main structure of a manual controller according to an embodiment of the present application.
Figure 10:
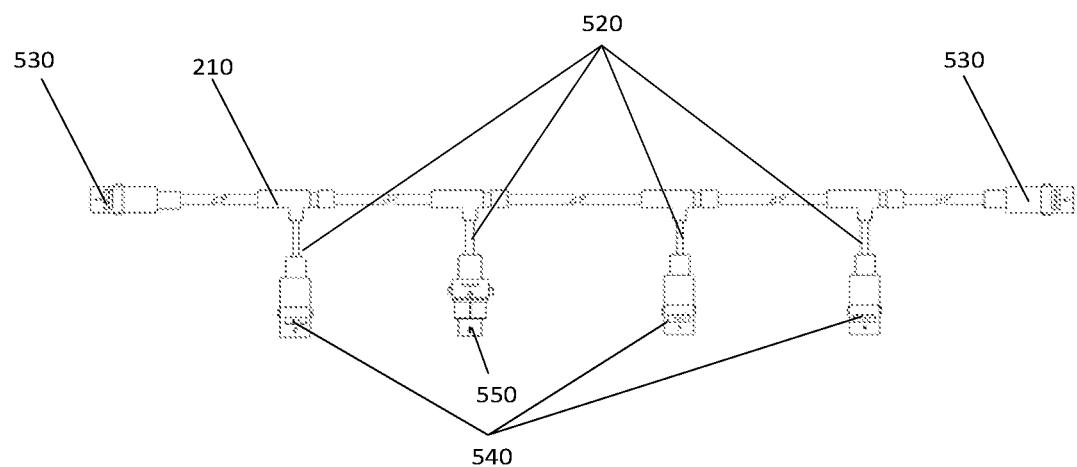
FIG. 10 is a schematic structural diagram of a multi-contact integrated cable according to an embodiment of the present application.
Figure 11:
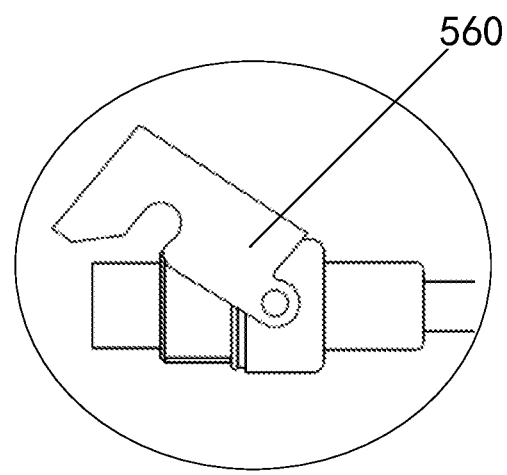
FIG. 11 is a schematic structural diagram of a reinforcement structure according to an embodiment of the present application.
Figure 12:
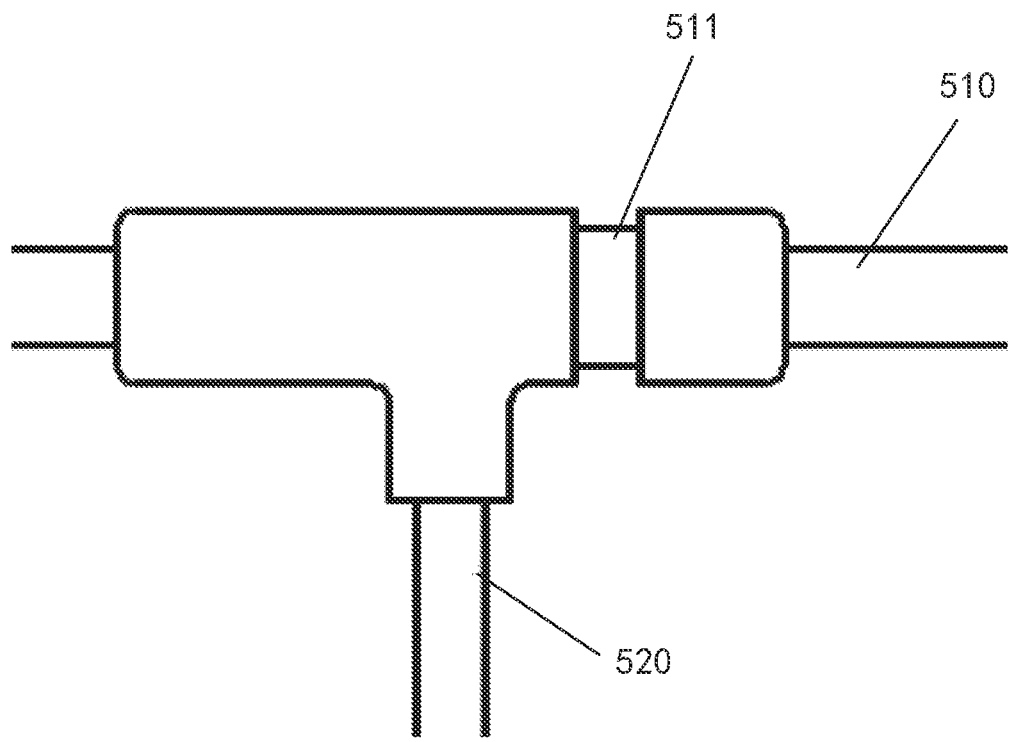
FIG. 12 is a schematic structural diagram of a retaining ring according to an embodiment of the present application.
Figure 13:
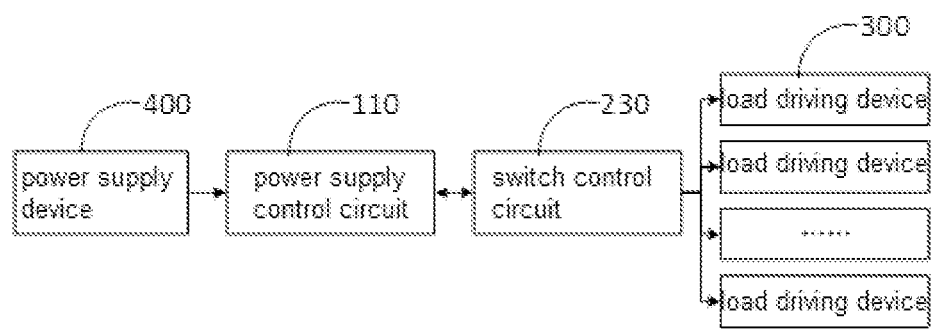
FIG. 13 is a block diagram of a switch protection circuit according to a second embodiment of the present application.
Figure 14:
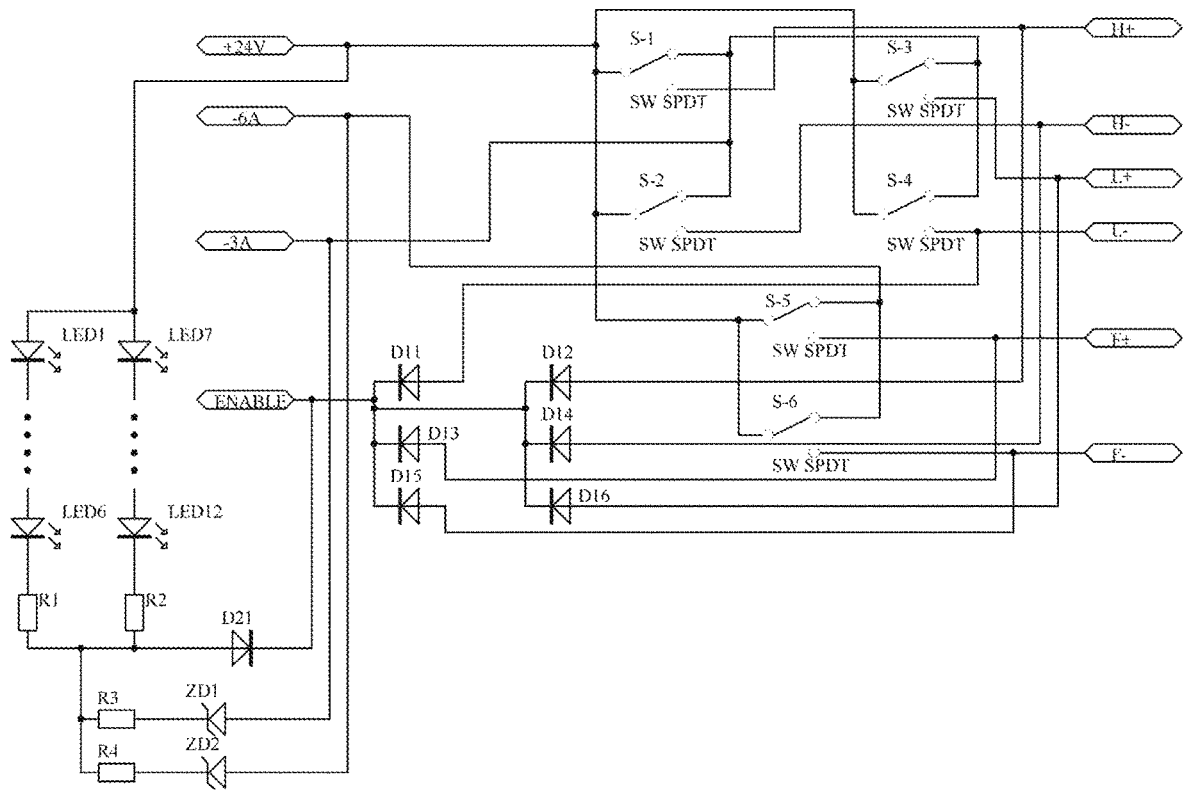
FIG. 14 is a circuit diagram of a circuit board of a switch control circuit according to a second embodiment of the present application.
Figure 15:
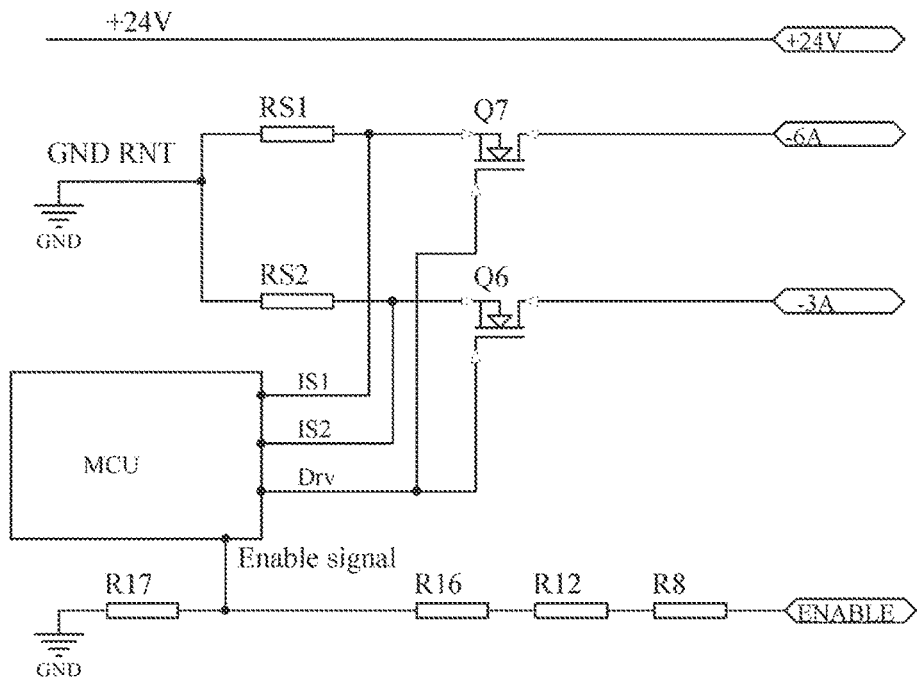
FIG. 15 is a schematic diagram of a power management circuit in a power control circuit according to a second embodiment of the present application.
Figure 16:
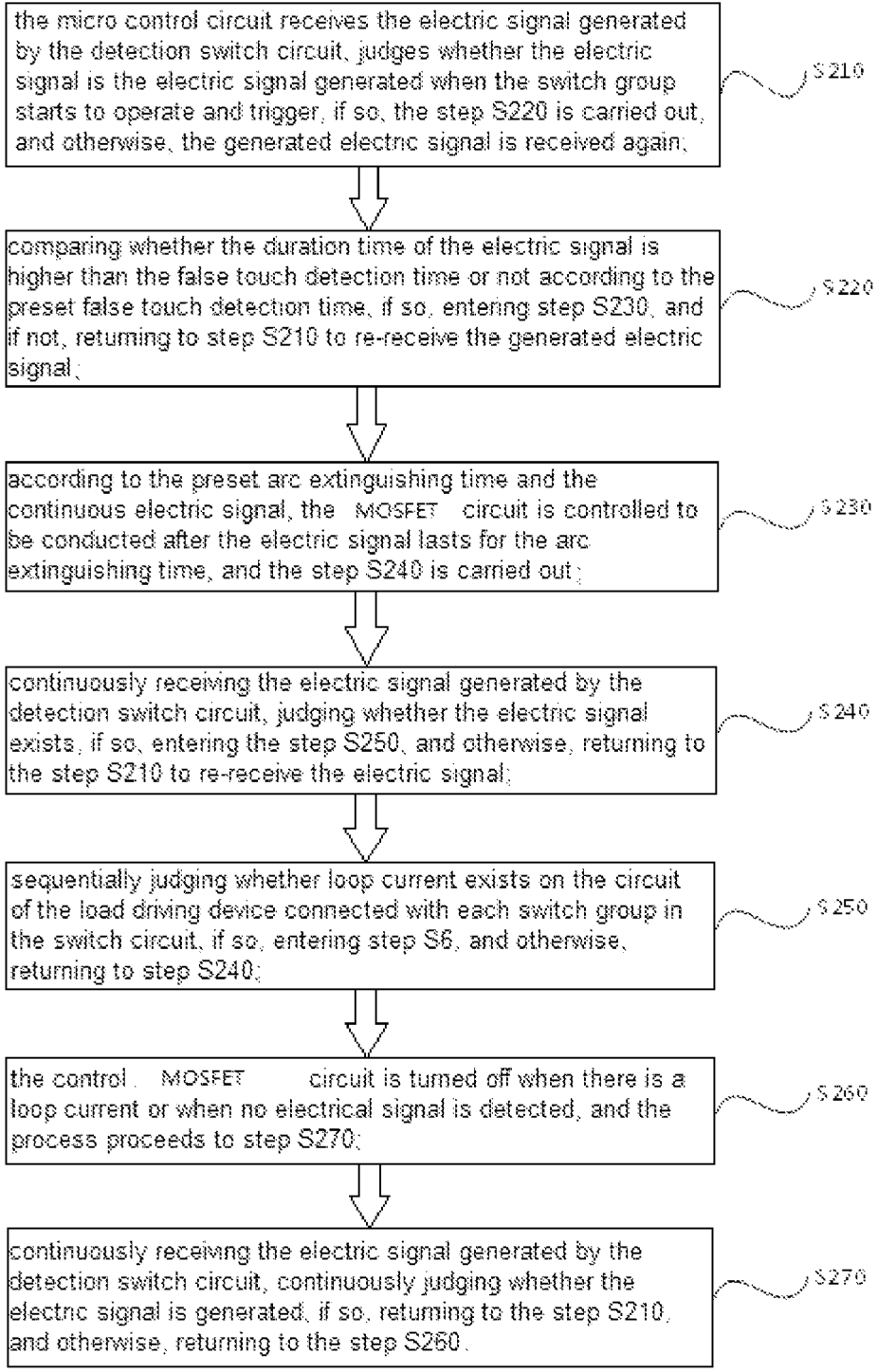
FIG. 16 is a flowchart of a protection method for a switch protection circuit according to a second embodiment of the present application.
Figure 17:
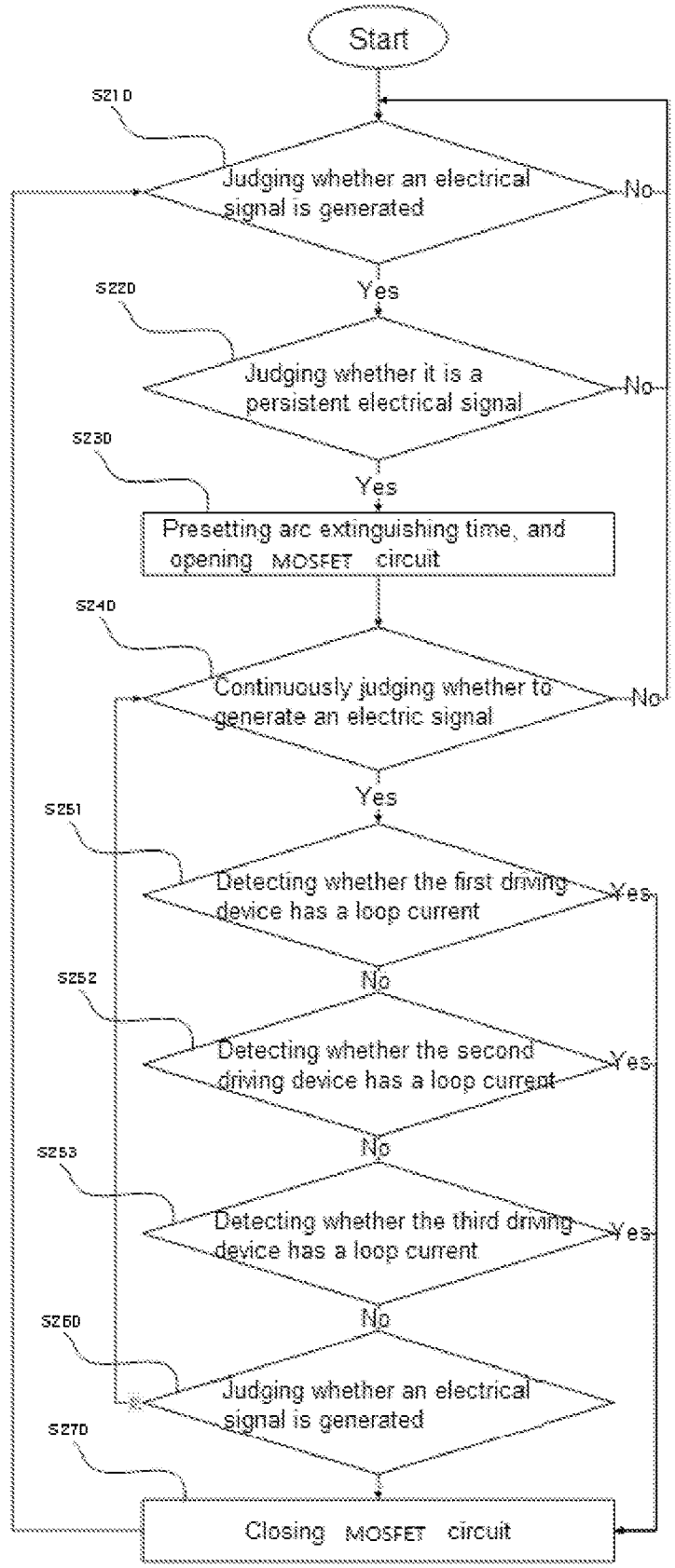
FIG. 17 is a flowchart of another protection method for a switch protection circuit according to the second embodiment of the present application.

Referring to FIGS. 7 to 8, a method for performing a switch circuit protection by using a switch circuit protection program according to an embodiment of the present application includes the following steps:

Step S210: the micro control circuit receives the electric signal generated by the detection switch circuit, judges whether the electric signal is the electric signal generated when the switch group starts to operate and trigger, if so, the step S220 is carried out, and otherwise, the generated electric signal is received again.

Step S220: comparing whether the duration time of the electric signal is longer than the false touch detection time or not according to the preset false touch detection time, if so, entering step S230, and if not, returning to step S210 to re-receive the generated electric signal.

Step S230: according to the preset arc extinguishing time and the continuous electric signal, the MOSFET circuit is controlled to be conducted after the electric signal lasts for the arc extinguishing time, and the step S240 is carried out.

Step S240: continuously receiving the electric signal generated by the detection switch circuit, judging whether the electric signal exists, if so, entering the step S250, and otherwise, returning to the step S210 to re-receive the electric signal.

Step S250: sequentially judging whether loop current exists on the circuit of the load driving device connected with each switch group in the switch circuit, if so, entering step S6, and otherwise, returning to step S240.

Assuming that the load driving device includes a first driving device, a second driving device, and a third driving device, step S250 further includes step S251, detecting whether the first driving device has a loop current, if so, entering step S260, and if not, entering step S252; step S252, detecting whether the second driving device has a loop current, if so, going to step S260, and if not, going to step S253; in step S253, it is detected whether the second driving device has a loop current, if so, the process proceeds to step S260, and if not, the process proceeds to step S240.

Step S260: the control MOSFET circuit is turned off when there is a loop current or no electrical signal is detected, and the process proceeds to step S270.

Step S270: and continuously receiving the electric signal generated by the detection switch circuit, continuously judging whether the electric signal is generated, if so, returning to the step S210, and otherwise, returning to the step S260.

Example Three

An embodiment of the present application provides a control device, including: the device comprises a device body and a multi-drive switch protection circuit arranged in the device body. Further, the multi-driving switch protection circuit includes a power control circuit 110 and a switch control circuit 230. The device body at least comprises a switch control device 200, a power supply control device 100 and a multi-connector integrated cable 500, wherein a switch control circuit 230 is arranged in the switch control device 200, and a power supply control circuit 110 is arranged in the power supply control device 100.

The switch control device 200 in this example includes at least one input terminal connected to the power control device 100 and a plurality of output terminals, each of which is connected to an adaptive load driving device 300. The switch control circuit 230 in the switch control device 200 is configured to adapt to the load driving device 300 and configured to receive a switch group corresponding to a user start operation, and the switch group controls the corresponding load driving device 300 to perform a movement in a preset direction.

The power control circuit 110 of the power control apparatus 100 in this example includes a micro control unit 112, a MOSFET unit 113, and a switch detection unit 111 for detecting that a switch group is operated and started by a user, where the micro control unit 112 is connected to the MOSFET unit 113 and the switch detection unit 111 respectively; wherein, the micro control unit 112 presets the arc extinguishing time; the power control device 100 is connected to the input end of the switch control device 200, the output end of the switch control device 200 is respectively connected to the adaptive load driving device 300, the input end of the switch control device 200 is connected to all switch sets in parallel, and each switch set is connected to the adaptive load driving device 300.

Further, when the switch group is not triggered to start by a user, all the electrical signal transmission paths are in a disconnected state, and after the switch group is started by the user, the MOSFET unit 113 is controlled to be switched on after delaying the arc extinguishing time period according to the arc extinguishing time preset by the micro control unit 112, so that the corresponding electrical signal transmission paths are switched on, and thus the load driving device 300 corresponding to the switch group operates after the switch group is triggered to start at the interval arc extinguishing time period, and the bed assembly of the bed main body is driven to perform corresponding posture adjustment.

The multi-connector integrated cable 500 in this embodiment comprises at least one input terminal 550, at least one input/output terminal 530, and a plurality of output terminals 540, wherein the input terminal 550 is connected to the power control apparatus 100, the input/output terminal 530 is connected to the switch control apparatus 200, and each output terminal 550 is connected to an adaptive load driving apparatus 300; the electrical signal transmission path formed between the switch control device 200, the power supply control device 100, and the various load driving devices 300 passes through the multi-connector integrated cable 500.

While preferred embodiments of the present invention have been described, additional variations and modifications in those embodiments may occur to those skilled in the art once they learn of the basic inventive concepts. Therefore, it is intended that the appended claims be interpreted as including the preferred embodiment and all changes and modifications that fall within the scope of the invention.

It will be apparent to those skilled in the art that various changes and modifications may be made in the present invention without departing from the spirit and scope of the invention. Thus, if such modifications and variations of the present invention fall within the scope of the claims of the present invention and their equivalents, the present invention is also intended to include such modifications and variations.

What is claimed is:

1. A multifunctional bed control device, for driving a bed body containing a plurality of bed components, the multifunctional bed control device comprising:
   a switch control device, a power supply control device, a plurality of load driving devices, and a multi-connector integrated cable;
   an electric signal transmission path being formed among the switch control device, the power supply control device, and the various load driving devices passing through the multi-connector integrated cable, supplying power to the load driving devices, and completing control to adapt the load driving devices to trigger the corresponding posture adjustment of the bed assembly;
   the plurality of load driving devices, being arranged on the bed body and being used for controlling the posture change of the bed assembly;
   the switch control device, being used to receive a user to control a plurality of bed components of the bed body to perform posture adjustment; the switch control device being arranged with a switch group corresponding to receive the start operation of a user in order to adapt to the load driving device, each switch group being connected with one adaptive load driving device, and the corresponding load driving device being controlled to move in a preset direction through the switch group; the switch group being in pairs, each switch pair comprising an uplink switch and a downlink switch, one of the uplink switch and the downlink switch being triggered to activate the electrical signal transmission path of the switch control device;
   the power supply control device being used for supplying power and controlling the transmission of electric signals; the power supply control device comprising a micro control unit, an MOSFET unit and a switch detection unit for detecting the switch group to be started by the operation of a user, the micro control unit being respectively connected with the MOSFET unit and the switch detection unit; when the switch group is not triggered to start by a user, all the electric signal transmission paths are in a disconnected state, and after the switch group is started by the user, the MOSFET unit is controlled to be switched on by the micro control unit, so that the corresponding electric signal transmission paths are switched on, and so that the load driving device corresponding to the switch group operates after the switch group is triggered to start, so as to drive the bed assembly of the bed main body to adjust the corresponding posture;
   the multi-connector integrated cable comprising at least one input connector, at least one input/output connector, and a plurality of output connectors, the input connector being connected to the power control device, the input/output connector being connected to the switch control device, each output connector being connected to an adapted load driving device.

2. The multifunctional bed control device according to claim 1, wherein the multi-connector integrated cable comprises a trunk portion fixed to the bed body, a plurality of branch portions distributed on the trunk portion, each of the branch portion being connected to the input connector, the input output connector and the output connector.

3. The multifunctional bed control device according to claim 2, wherein the trunk portion is provided with a plurality of retaining rings, the retaining rings being used to secure the trunk portion at one side of the bed body.

4. A multifunctional bed control circuit, applied to the multifunctional bed control device of claim 3, the multifunctional bed control circuit comprising:
   a plurality of load driving circuits, being arranged on the bed body and being used for controlling the posture change of the bed assembly;
   a switch control circuit, receiving a user to control a plurality of bed components of the bed body to perform posture adjustment; the switch control circuit being arranged with a switch group corresponding to receive the start operation of a user in order to adapt to the load driving circuit, each switch group being connected with one adaptive load driving circuit, and the corresponding load driving device being controlled to move in a preset direction through the switch group;
   a power supply control circuit, being used for supplying power and controlling the transmission of electric signals;
   a multi-connector integrated circuit, comprising at least one input connector, at least one or two input/output connector, and a plurality of output connectors, the input connector being connected to the power control circuit, the input/output connector being connected to the switch control circuit, each output connector being connected to an adapted the load driving circuit; the power supply control circuit being connected with a power supply circuit, receiving the output electrical signal, an electric signal transmission path being formed among the switch control circuit, the power supply control circuit, and the various load driving circuits passing through the multi-connector integrated circuit, supplying power to the load driving circuits, and completing control to adapt the load driving circuits to trigger the corresponding posture adjustment of the bed assembly.

5. The multifunctional bed control device according to claim 1, wherein an arc extinguishing time is preset by the micro control unit, and the MOSFET unit is controlled to be switched on after delaying the arc extinguishing time period according to the arc extinguishing time preset by the micro control unit, so that the corresponding electric signal transmission paths are switched on, and so that the load driving device corresponding to the switch group operates after the switch group is triggered to start at the interval arc extinguishing time period.

6. A multifunctional bed control circuit, applied to the multifunctional bed control device of claim 5, the multifunctional bed control circuit comprising:
   a plurality of load driving circuits, being arranged on the bed body and being used for controlling the posture change of the bed assembly;
   a switch control circuit, receiving a user to control a plurality of bed components of the bed body to perform posture adjustment; the switch control circuit being arranged with a switch group corresponding to receive the start operation of a user in order to adapt to the load driving circuit, each switch group being connected with one adaptive load driving circuit, and the corresponding load driving device being controlled to move in a preset direction through the switch group;
   a power supply control circuit, being used for supplying power and controlling the transmission of electric signals;

a multi-connector integrated circuit, comprising at least one input connector, at least one or two input/output connector, and a plurality of output connectors, the input connector being connected to the power control circuit, the input/output connector being connected to the switch control circuit, each output connector being connected to an adapted the load driving circuit; the power supply control circuit being connected with a power supply circuit, receiving the output electrical signal, an electric signal transmission path being formed among the switch control circuit, the power supply control circuit, and the various load driving circuits passing through the multi-connector integrated circuit, supplying power to the load driving circuits, and completing control to adapt the load driving circuits to trigger the corresponding posture adjustment of the bed assembly.

7. The multifunctional bed control device according to claim 1, wherein the switch detection unit is positioned on the electric signal transmission path where the power supply control device is positioned, and when the electric signal transmission path is conducted, the switch detection unit generates a corresponding electric signal;

the micro control unit controls the MOSFET unit to be conducted according to the electric signals generated by the switch detection unit, so that the electric signals generated by the switch detection unit pass through the MOSFET unit, and then pass through the uplink switch/the downlink switch which is triggered to start, so that the output end of the connected load driving device is controlled to move, and the bed assembly is driven to move upwards/downwards in a corresponding posture.

8. The multifunctional bed control device according to claim 7, wherein the switch control device comprises a hand controller body and a circuit board fixed in the hand controller body; the surface of the hand controller body is provided with a key panel, and the key panel is provided with a key portion matched with the switch group;

the circuit board is provided with the uplink switch and the downlink switch, and the circuit board is abutted to the key portion.

9. The multifunctional bed control device according to claim 8, wherein the hand controller main body includes an upper casing, a lower casing, and a bracket portion, the bracket portion is fixed to the upper casing, and the bracket portion is provided with a positioning hole;

the circuit board is fixed to the lower housing, and the uplink switch or the downlink switch thereon passes through the positioning hole and abuts against the upper housing.

10. A multifunctional bed control circuit, applied to the multifunctional bed control device of claim 9, the multifunctional bed control circuit comprising:

a plurality of load driving circuits, being arranged on the bed body and being used for controlling the posture change of the bed assembly;

a switch control circuit, receiving a user to control a plurality of bed components of the bed body to perform posture adjustment; the switch control circuit being arranged with a switch group corresponding to receive the start operation of a user in order to adapt to the load driving circuit, each switch group being connected with one adaptive load driving circuit, and the corresponding load driving device being controlled to move in a preset direction through the switch group;

a power supply control circuit, being used for supplying power and controlling the transmission of electric signals;

a multi-connector integrated circuit, comprising at least one input connector, at least one or two input/output connector, and a plurality of output connectors, the input connector being connected to the power control circuit, the input/output connector being connected to the switch control circuit, each output connector being connected to an adapted the load driving circuit; the power supply control circuit being connected with a power supply circuit, receiving the output electrical signal, an electric signal transmission path being formed among the switch control circuit, the power supply control circuit, and the various load driving circuits passing through the multi-connector integrated circuit, supplying power to the load driving circuits, and completing control to adapt the load driving circuits to trigger the corresponding posture adjustment of the bed assembly.

11. The multifunctional bed control device according to claim 8, wherein the key panel is concave, each key portion is convex along the bottom of the concave, and the key portions and the concave are integrally formed.

12. A multifunctional bed control circuit, applied to the multifunctional bed control device of claim 11, the multifunctional bed control circuit comprising:

a plurality of load driving circuits, being arranged on the bed body and being used for controlling the posture change of the bed assembly;

a switch control circuit, receiving a user to control a plurality of bed components of the bed body to perform posture adjustment; the switch control circuit being arranged with a switch group corresponding to receive the start operation of a user in order to adapt to the load driving circuit, each switch group being connected with one adaptive load driving circuit, and the corresponding load driving device being controlled to move in a preset direction through the switch group;

a power supply control circuit, being used for supplying power and controlling the transmission of electric signals;

a multi-connector integrated circuit, comprising at least one input connector, at least one or two input/output connector, and a plurality of output connectors, the input connector being connected to the power control circuit, the input/output connector being connected to the switch control circuit, each output connector being connected to an adapted the load driving circuit; the power supply control circuit being connected with a power supply circuit, receiving the output electrical signal, an electric signal transmission path being formed among the switch control circuit, the power supply control circuit, and the various load driving circuits passing through the multi-connector integrated circuit, supplying power to the load driving circuits, and completing control to adapt the load driving circuits to trigger the corresponding posture adjustment of the bed assembly.

13. The multifunctional bed control device according to claim 8, wherein each group of key portions is provided with wear-resistant function marks, and each key portion is provided with wear-resistant indication marks.

14. A multifunctional bed control circuit, applied to the multifunctional bed control device of claim 13, the multifunctional bed control circuit comprising:

a plurality of load driving circuits, being arranged on the bed body and being used for controlling the posture change of the bed assembly;

a switch control circuit, receiving a user to control a plurality of bed components of the bed body to perform posture adjustment; the switch control circuit being arranged with a switch group corresponding to receive the start operation of a user in order to adapt to the load driving circuit, each switch group being connected with one adaptive load driving circuit, and the corresponding load driving device being controlled to move in a preset direction through the switch group;

a power supply control circuit, being used for supplying power and controlling the transmission of electric signals;

a multi-connector integrated circuit, comprising at least one input connector, at least one or two input/output connector, and a plurality of output connectors, the input connector being connected to the power control circuit, the input/output connector being connected to the switch control circuit, each output connector being connected to an adapted the load driving circuit; the power supply control circuit being connected with a power supply circuit, receiving the output electrical signal, an electric signal transmission path being formed among the switch control circuit, the power supply control circuit, and the various load driving circuits passing through the multi-connector integrated circuit, supplying power to the load driving circuits, and completing control to adapt the load driving circuits to trigger the corresponding posture adjustment of the bed assembly.

15. The multifunctional bed control device according to claim 8, wherein the key portion is made of soft, elastic, light-transmitting silicone; a light-emitting circuit is arranged on the circuit board, and an LED light source is arranged on the light-emitting circuit; after the light-emitting circuit is electrically connected with the power supply control device, the LED light source continuously emits light and penetrates out along the key portion to generate backlight so as to press the key in the dark and without illumination.

16. A multifunctional bed control circuit, applied to the multifunctional bed control device of claim 15, the multifunctional bed control circuit comprising:

a plurality of load driving circuits, being arranged on the bed body and being used for controlling the posture change of the bed assembly;

a switch control circuit, receiving a user to control a plurality of bed components of the bed body to perform posture adjustment; the switch control circuit being arranged with a switch group corresponding to receive the start operation of a user in order to adapt to the load driving circuit, each switch group being connected with one adaptive load driving circuit, and the corresponding load driving device being controlled to move in a preset direction through the switch group;

a power supply control circuit, being used for supplying power and controlling the transmission of electric signals;

a multi-connector integrated circuit, comprising at least one input connector, at least one or two input/output connector, and a plurality of output connectors, the input connector being connected to the power control circuit, the input/output connector being connected to the switch control circuit, each output connector being connected to an adapted the load driving circuit; the power supply control circuit being connected with a power supply circuit, receiving the output electrical signal, an electric signal transmission path being formed among the switch control circuit, the power supply control circuit, and the various load driving circuits passing through the multi-connector integrated circuit, supplying power to the load driving circuits, and completing control to adapt the load driving circuits to trigger the corresponding posture adjustment of the bed assembly.

17. The multifunctional bed control device according to claim 1, wherein the switch detection unit comprises a resistor RS1 adapted to the uplink switch and a resistor RS2 adapted to the downlink switch, the MOSFET unit comprises an MOSFET Q7 matched with the uplink switch and an MOSFET Q6 matched with the downlink switch; the micro control unit comprises a first input pin and a second input pin;

one end of the resistor RS1 is grounded, and the other end of the resistor RS1 is connected with a first input pin of the micro control unit and the source/drain electrode of the MOS transistor Q7 respectively; one end of the resistor RS2 is grounded, the other end of the resistor RS2 is connected with a second input pin of the micro control unit and a source/drain electrode of the MOSFET Q6 respectively, an electric signal generated by trigger operation is detected through the resistor RS1 or the resistor RS2, and a trigger signal is sent to the micro control unit.

18. The multifunctional bed control device according to claim 17, wherein the micro control unit comprises an output pin, and the output pin of the micro control unit is connected to the gates of the MOS transistor Q7 and the MOS transistor Q6 respectively, for delaying a set arc extinguishing time and then sending a signal to the gate, so as to conduct the corresponding MOS transistor Q7 or the corresponding MOS transistor Q6.

19. A multifunctional bed control circuit, applied to the multifunctional bed control device of claim 2, the multifunctional bed control circuit comprising:

a plurality of load driving circuits, being arranged on the bed body and being used for controlling the posture change of the bed assembly;

a switch control circuit, receiving a user to control a plurality of bed components of the bed body to perform posture adjustment; the switch control circuit being arranged with a switch group corresponding to receive the start operation of a user in order to adapt to the load driving circuit, each switch group being connected with one adaptive load driving circuit, and the corresponding load driving device being controlled to move in a preset direction through the switch group;

a power supply control circuit, being used for supplying power and controlling the transmission of electric signals;

a multi-connector integrated circuit, comprising at least one input connector, at least one or two input/output connector, and a plurality of output connectors, the input connector being connected to the power control circuit, the input/output connector being connected to the switch control circuit, each output connector being connected to an adapted the load driving circuit; the power supply control circuit being connected with a power supply circuit, receiving the output electrical signal, an electric signal transmission path being formed among the switch control circuit, the power supply control circuit, and the various load driving circuits passing through the multi-connector integrated circuit, supplying power to the load driving circuits, and completing control to adapt the load driving circuits to trigger the corresponding posture adjustment of the bed assembly.

20. A multifunctional bed control circuit, applied to the multifunctional bed control device of claim 1, the multifunctional bed control circuit comprising:

a plurality of load driving circuits, being arranged on the bed body and being used for controlling the posture change of the bed assembly;

a switch control circuit, receiving a user to control a plurality of bed components of the bed body to perform posture adjustment; the switch control circuit being arranged with a switch group corresponding to receive the start operation of a user in order to adapt to the load driving circuit, each switch group being connected with one adaptive load driving circuit, and the corresponding load driving device being controlled to move in a preset direction through the switch group;

a power supply control circuit, being used for supplying power and controlling the transmission of electric signals;

a multi-connector integrated circuit, comprising at least one input connector, at least one or two input/output connector, and a plurality of output connectors, the input connector being connected to the power control circuit, the input/output connector being connected to the switch control circuit, each output connector being connected to an adapted the load driving circuit; the power supply control circuit being connected with a power supply circuit, receiving the output electrical signal, an electric signal transmission path being formed among the switch control circuit, the power supply control circuit, and the various load driving circuits passing through the multi-connector integrated circuit, supplying power to the load driving circuits, and completing control to adapt the load driving circuits to trigger the corresponding posture adjustment of the bed assembly.

* * * * *